US012782857B2

(12) United States Patent
Shimizu et al.

(10) Patent No.: US 12,782,857 B2
(45) Date of Patent: Nov. 3, 2026

(54) IMAGE FORMING APPARATUS

(71) Applicant: KYOCERA Document Solutions Inc., Osaka (JP)

(72) Inventors: Tamotsu Shimizu, Osaka (JP); Masaki Kadota, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/068,580

(22) Filed: Mar. 3, 2025

(65) Prior Publication Data

US 2025/0291293 A1 Sep. 18, 2025

(30) Foreign Application Priority Data

Mar. 14, 2024 (JP) ................................ 2024-040103

(51) Int. Cl.
*G03G 15/00* (2006.01)

(52) U.S. Cl.
CPC ..... *G03G 15/5037* (2013.01); *G03G 15/5045* (2013.01); *G03G 2215/0607* (2013.01)

(58) Field of Classification Search
CPC ............ G03G 15/065; G03G 15/0266; G03G 15/5037; G03G 15/1675; G03G 15/5058
See application file for complete search history.

(56) References Cited

U.S. PATENT DOCUMENTS 4,592,646 A * 6/1986 Suzuki ............... G03G 15/5037 399/43
2004/0141765 A1* 7/2004 Shimura ............ G03G 15/0855 399/49
2021/0149321 A1* 5/2021 Shimizu ............... G03G 15/556
2021/0302859 A1 9/2021 Tanaka et al. ..... G03G 15/0266

FOREIGN PATENT DOCUMENTS

JP 2021-157163 A 10/2021

* cited by examiner

*Primary Examiner* — Jessica L Eley
(74) *Attorney, Agent, or Firm* — Stein IP, LLC

(57) ABSTRACT

A control portion can perform an image formation mode to perform image formation while controlling, based on the relationship between a charging current and the surface potential on an image carrying member, a charging voltage and thereby adjusting the surface potential and a correction mode to correct the relationship between the charging current and the surface potential. In the correction mode, the control portion calculates the surface potential on the image carrying member based on the developing voltage applied and the developing current sensed by a developing current sensing portion and corrects the relationship between the charging current and the surface potential based on the calculated surface potential.

7 Claims, 11 Drawing Sheets

Fig.11

| | | | | | | | | | | | | | | |
|---|---|---|---|---|---|---|---|---|---|---|---|---|---|---|
| | TEMPERATURE AROUND BODY | 21°C | | | 10°C | | 21°C | | | 32°C | | 21°C | | |
| | TEMPERATURE AROUND DRUM | 22°C | 40°C | 40°C | 12°C | 28°C | 22°C | 40°C | 40°C | 32°C | 42°C | 22°C | 40°C | 40°C |
| | NUMBER OF SHEETS (K SHEETS) | 0 | 50 | 100 | 100 | 150 | 150 | 200 | 250 | 250 | 300 | 300 | 350 | 400 |
| COMPARATIVE EXAMPLE | SURFACE POTENTIAL Vo (V) | 215 | 231 | 236 | 285 | 288 | 220 | 231 | 227 | 153 | 169 | 221 | 233 | 234 |
| | DEVELOPING DC VOLTAGE Vdc(V) | 180 | 195 | 201 | 238 | 242 | 188 | 197 | 194 | 126 | 144 | 191 | 202 | 205 |
| | Vo-Vdc(V) | 35 | 36 | 35 | 47 | 46 | 32 | 34 | 33 | 27 | 25 | 30 | 31 | 29 |
| | FOGGING | 0.005 | 0.006 | 0.005 | 0.003 | 0.003 | 0.007 | 0.008 | 0.007 | 0.016 | 0.017 | 0.012 | 0.011 | 0.012 |
| | EVALUATION | ○ | ○ | ○ | ○ | ○ | ○ | ○ | ○ | × | × | × | × | × |
| PRACTICAL EXAMPLE | SURFACE POTENTIAL Vo (V) | 230 | 243 | 254 | 285 | 295 | 235 | 249 | 245 | 175 | 198 | 238 | 250 | 251 |
| | DEVELOPING DC VOLTAGE Vdc(V) | 180 | 193 | 204 | 235 | 245 | 185 | 199 | 195 | 125 | 148 | 188 | 200 | 201 |
| | Vo-Vdc(V) | 50 | 50 | 50 | 50 | 50 | 50 | 50 | 50 | 50 | 50 | 50 | 50 | 50 |
| | FOGGING | 0.003 | 0.005 | 0.004 | 0.003 | 0.003 | 0.005 | 0.004 | 0.005 | 0.007 | 0.008 | 0.006 | 0.007 | 0.007 |
| | EVALUATION | ○ | ○ | ○ | ○ | ○ | ○ | ○ | ○ | ○ | ○ | ○ | ○ | ○ |

IMAGE FORMING APPARATUS

INCORPORATION BY REFERENCE

This application is based on and claims the benefit of priority from Japanese Patent Application No. 2024-040103 filed on Mar. 14, 2024, the contents of which are hereby incorporated by reference.

BACKGROUND

The present disclosure relates to image forming apparatuses incorporating an image carrying member, such as copiers, printers, and facsimile machines as well as multifunction peripherals having their functions integrated together.

A known image forming apparatus includes an image forming portion, a developing voltage power supply, a charging voltage power supply, a developing current sensing portion, a charging current sensing portion, and a control portion. The image forming portion incudes an image carrying member, a charging device, an exposure device, and a developing device. The image carrying member has a photosensitive layer formed on its surface. The charging device has a charging member that electrostatically charges the image carrying member. The exposure device forms an electrostatic latent image by exposing to light the image carrying member electrostatically charged by the charging device. The developing device is disposed opposite the image carrying member, includes a developer carrying member that carries developer, and forms a toner image by attaching toner to the electrostatic latent image formed on the image carrying member. The developing voltage power supply applies a developing voltage to the developer carrying member. The charging voltage power supply applies to the developer carrying member a developing voltage that contains at least a direct-current component. The developing current sensing portion senses a developing current that passes between the developer carrying member and the image carrying member. The charging current sensing portion senses a charging current that passes between the charging member and the image carrying member. The control portion controls the image forming portion, the developing voltage power supply, and the charging voltage power supply.

Based on the developing voltage applied and the developing current sensed by the developing current sensing portion, the surface potential on the image carrying member can be calculated.

On the known image forming apparatus, when an image formation mode is performed, if the surface potential is corrected based on a calculated surface potential, a user may have to wait for a long period and feel inconvenience.

In view of the above inconvenience, an object of the present disclosure is to provide an image forming apparatus that offers improved convenience while suppressing image defects.

SUMMARY

To achieve the above object, according to one aspect of the present disclosure, an image forming apparatus includes an image forming portion, a developing voltage power supply, a charging voltage power supply, a developing current sensing portion, a charging current sensing portion, and a control portion. The image forming portion includes an image carrying member, a charging device, an exposure device, and a developing device. The image carrying member has a photosensitive layer formed on a surface thereof. The charging device includes a charging member that electrostatically charges the image carrying member. The exposure device forms an electrostatic latent image by exposing to light the image carrying member electrostatically charged by the charging device. The developing device is disposed opposite the image carrying member, includes a developer carrying member that carries developer, and forms a toner image by attaching toner to the electrostatic latent image formed on the image carrying member. The developing voltage power supply applies a developing voltage to the developer carrying member. The charging voltage power supply applies a charging voltage containing at least a direct-current component to the charging member. The developing current sensing portion senses a developing current passing between the developer carrying member and the image carrying member. The charging current sensing portion senses a charging current passing between the charging member and the image carrying member. The control portion controls the image forming portion, the developing voltage power supply, and the charging voltage power supply. The control portion can perform an image formation mode in which it performs image formation while controlling, based on the relationship between the charging current and the surface potential on the image carrying member, the charging voltage applied and thereby adjusting the surface potential and a correction mode in which it corrects the relationship between the charging current and the surface potential. When the correction mode is performed, the control portion calculates the surface potential on the image carrying member based on the developing voltage applied and the developing current sensed by the developing current sensing portion and corrects the relationship between the charging current and the surface potential based on the calculated surface potential.

This and other objects of the present disclosure, and the specific benefits obtained according to the present disclosure, will become apparent from the description of embodiments which follows.

BRIEF DESCRIPTION OF THE DRAWINGS

FIG. 11 is a table showing evaluation results on image defects.

DETAILED DESCRIPTION

Figure 1:
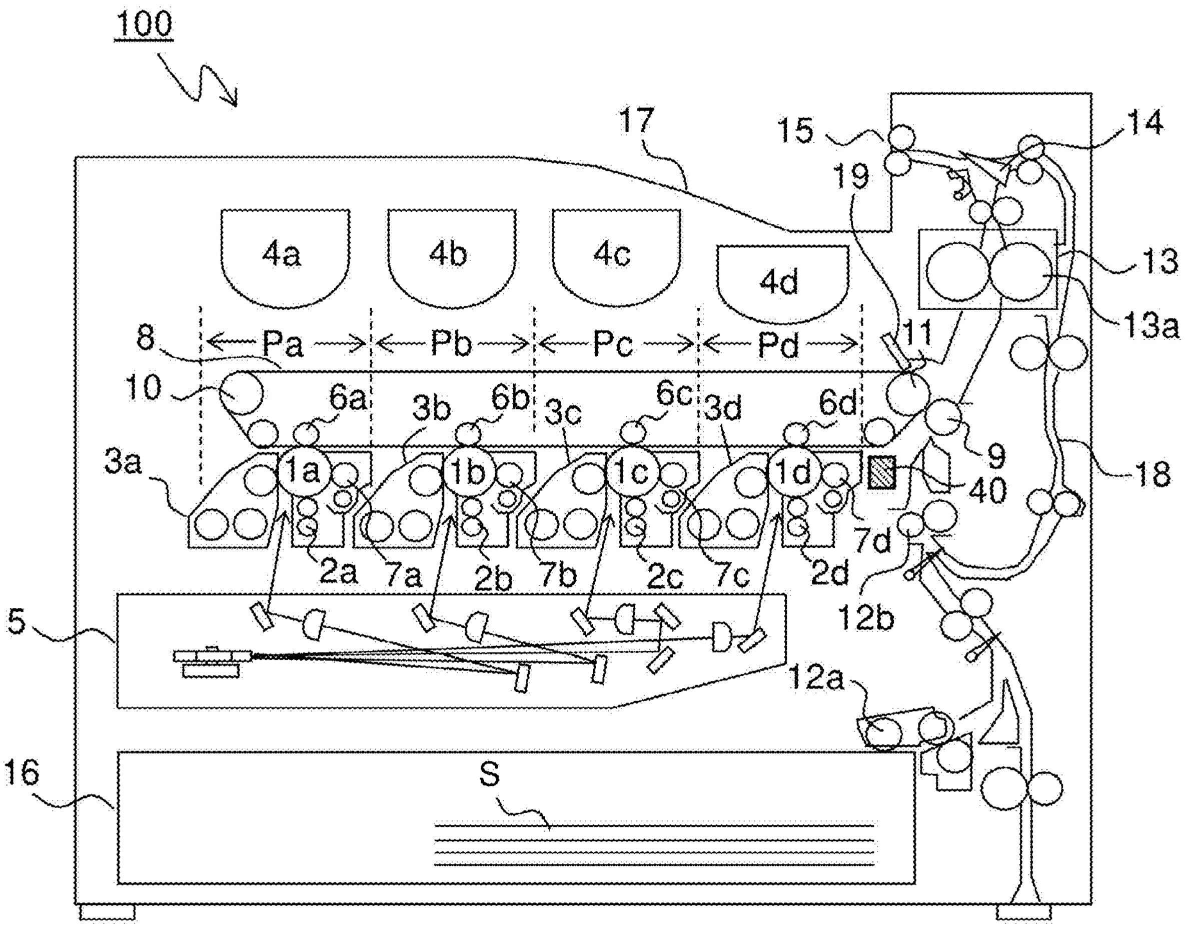
FIG. 1 is a side sectional view showing the internal construction of an image forming apparatus 100 according to a first embodiment of the present disclosure.

First Embodiment: Embodiments of the present disclosure will be described below with reference to the accompanying diagrams. FIG. 1 is a side sectional view showing the internal construction of an image forming apparatus 100 according to a first embodiment of the present disclosure.

The image forming apparatus 100 includes image forming portions Pa to Pd, a developing voltage power supply 43, a charging voltage power supply 45, a transfer voltage power supply 47, a developing current sensing portion 44, a charging current sensing portion 46, a main control portion (control portion) 80, an image density sensor (image density sensing device) 40, and a temperature sensor (temperature measurement portion) 41.

In the body of the image forming apparatus 100 (here, a color printer), the four image forming portions Pa, Pb, Pc, and Pd are arranged in this order from upstream (left in FIG. 1) along the conveyance direction. The image forming portions Pa to Pd are provided to correspond to four different colors (yellow, cyan, magenta, and black), and form a yellow, a cyan, a magenta, and a black image sequentially, each through the processes of electrostatic charging, exposure to light, image development, and image transfer.

The image forming portions Pa to Pd include primary transfer rollers (transferring members) 6*a* to 6*d*, photosensitive drums (image carrying members) 1*a* to 1*d* that carry the visible images (toner images) of the different colors, charging devices 2*a* to 2*d*, an exposure device 5, and developing devices 3*a* to 3*d*. Adjacent to the image forming portions Pa to Pd, an intermediate transfer belt (transfer destination member) 8 is provided that is rotated counterclockwise in FIG. 1 by a driving mechanism (not shown).

The primary transfer rollers (transferring members) 6*a* to 6*d* are disposed opposite the photosensitive drums (image carrying members) 1*s* to 1*d*, and are fed with a predetermined transfer voltage to transfer to the intermediate transfer belt (transfer destination member) 8 the visible images (toner images) of the different colors formed on the photosensitive drums (image carrying members) 1*a* to 1*d*. As a result, the toner images formed on the photosensitive drums 1*a* to 1*d* are primarily transferred sequentially to, while being overlayed on each other, the intermediate transfer belt 8 that moves while in contact with the photosensitive drums 1*a* to 1*d*.

The toner images primarily transferred to the intermediate transfer belt 8 are secondarily transferred to a sheet S as one example of a recording medium by a secondary transfer roller 9. The sheet S to which the toner images are secondarily transferred is stored in a sheet cassette 16 disposed in a lower part of the body of the image forming apparatus 100. The sheet S is conveyed via a sheet feed roller 12*a* and a pair of registration rollers 12*b* to a nip portion between the secondary transfer roller 9 and a driving roller 11 for the intermediate transfer belt 8.

Used as the intermediate transfer belt 8 is a sheet of a dielectric resin, typically a belt with no seam (seamless belt). Downstream of the secondary transfer roller 9, a blade-form belt cleaner 19 is disposed for the removal of the toner and the like that are left on the surface of the intermediate transfer belt 8.

Figure 3:
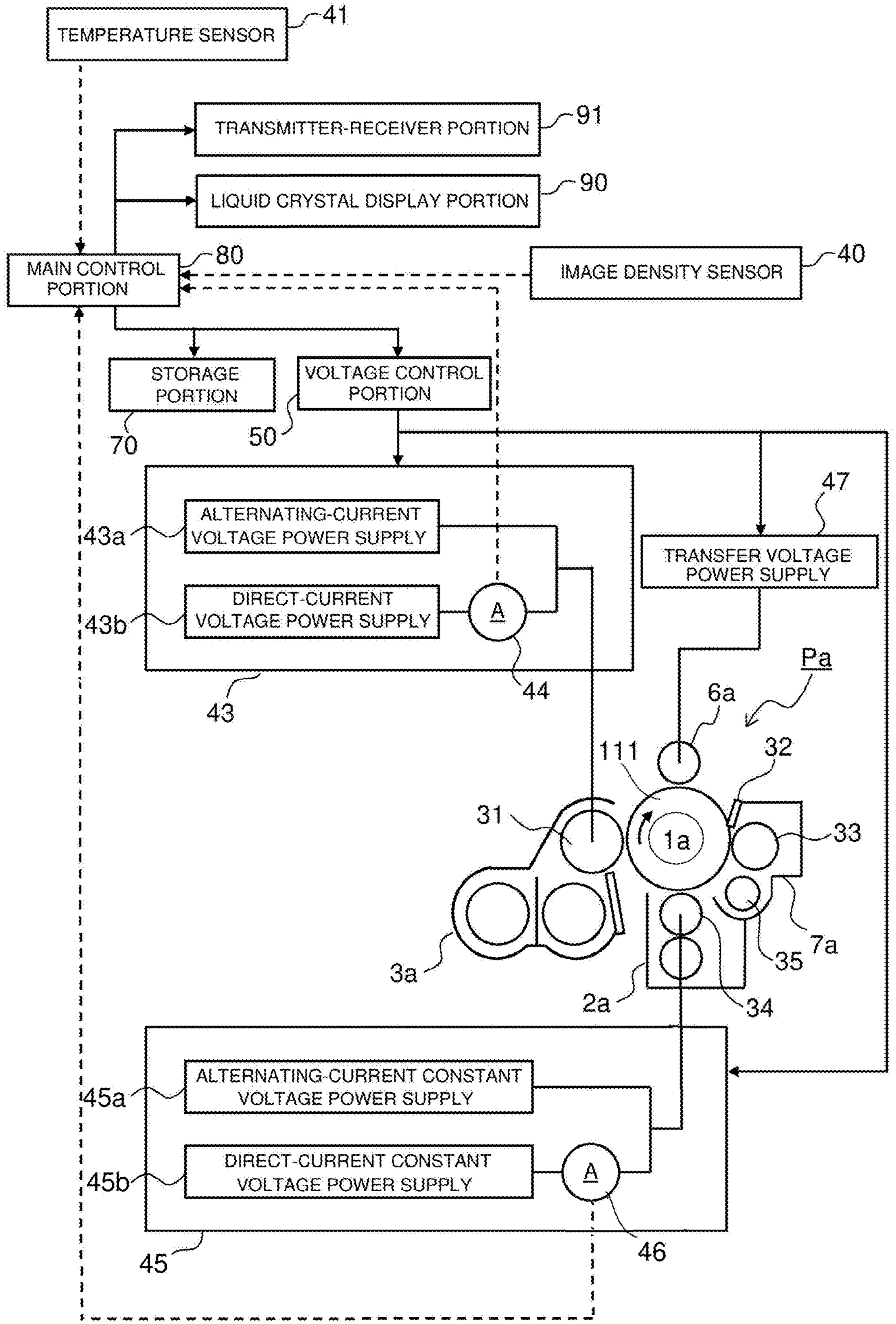
FIG. 3 is an enlarged part view around an image forming portion Pa, showing control paths in the image forming apparatus 100 as well, according to the first embodiment of the present disclosure.

The photosensitive drums (image carrying members) 1*a* to 1*d* have a photosensitive layer 111 formed on their surface (see FIG. 3). In this embodiment, the photosensitive drums (image carrying members) 1*a* to 1*d* each have a photosensitive layer 111 formed on the surface of a cylinder of aluminum, and the photosensitive layer 111 is formed by vapor deposition of amorphous silicon, which is a positively-chargeable photoconductor. That is, the photosensitive layer 111 is of a positively-chargeable single-layer type. The photosensitive layer 111 preferably has a layer thickness of about 20 μm before use.

The charging devices 2*a* to 2*d* include charging rollers (charging members) 34 that electrostatically charge the photosensitive drums (image carrying members) 1*a* to 1*d*. The charging rollers 34 are disposed opposite the photosensitive drums (image carrying members) 1*a* to 1*d* to electrostatically charge the photosensitive drums (image carrying members) 1*a* to 1*d*. The charging roller 34 is formed, for example, by coating a metal base with a layer of epichlorohydrin rubber as an electrically conductive elastic material. In this embodiment, the charging rollers 34 stay in contact with the photosensitive drums 1*a* to 1*d* respectively. The charging rollers 34 can be kept out of contact with the photosensitive drums 1*a* to 1*d* respectively.

The exposure device 5 exposes to light the photosensitive drums (image carrying members) 1*a* to 1*d* electrostatically charged by the charging devices 2*a* to 2*d* to form electrostatic latent images.

The developing devices 3*a* to 3*d* each have a developing roller (developer carrying member) 31. The developing rollers (developer carrying members) 31 are disposed opposite the photosensitive drums (image carrying members) 1*a* to 1*d* and carry two-component developer containing magnetic carrier and toner. The developing devices 3*a* to 3*d* apply a predetermined developing voltage to the developing rollers (developer carrying members) 31 and thereby attach toner to the electrostatic latent images formed on the photosensitive drums (image carrying members) 1*a* to 1*d* to form toner images.

When image data is fed in from a host device such as a personal computer, first, the charging devices 2*a* to 2*d* electrostatically charge the surfaces of the photosensitive drums 1*a* to 1*d* uniformly. Next, the exposure device 5 emits light according to the image data to form electrostatic latent images according to the image data on the photosensitive drums 1*a* to 1*d*.

The developing devices 3*a* to 3*d* are loaded with predetermined amounts of two-component developer containing yellow, cyan, magenta, and black toner, respectively. The toner in the developer is supplied from the developing devices 3*a* to 3*d* to the photosensitive drums 1*a* to 1*d* and electrostatically attaches to them, so that toner images according to the electrostatic latent images formed by exposure to light from the exposure device 5 are formed.

The primary transfer rollers 6*a* to 6*d* then produce an electric field with a predetermined transfer voltage between the primary transfer rollers 6*a* to 6*d* and the photosensitive drums 1*a* to 1*d*, so that the yellow, cyan, magenta, and black toner images on the photosensitive drums 1*a* to 1*d* are primarily transferred to the intermediate transfer belt 8. These images of four colors are formed in a predetermined positional relationship previously determined to form a predetermined full-color image. Then, in preparation for the subsequent formation of new electrostatic latent images, the toner and the like that are left on the surfaces of the photosensitive drums 1*a* to 1*d* are removed by cleaning devices 7*a* to 7*d*.

The intermediate transfer belt 8 is stretched around a driven roller 10, at the upstream side, and a driving roller 11, at the downstream side. When as a driving motor (not shown) rotates the driving roller 11 the intermediate transfer belt 8 starts to rotate counterclockwise, a sheet S is conveyed from the pair of registration rollers 12*b*, with predetermined timing, to a nip portion (secondary transfer nip portion) between the driving roller 11 and the secondary transfer roller 9, of which the latter is provided adjacent to the former, and the full-color image on the intermediate transfer belt 8 is secondarily transferred to the sheet S. The sheet S having the toner image transferred to it is conveyed to a fixing portion 13.

The sheet S conveyed to the fixing portion 13 is heated and pressed by a pair of fixing rollers 13*a*, so that the toner image is fixed to the surface of the sheet S to form the predetermined full-color image. The sheet S having the full-color image formed on it has its conveyance direction switched by a branch portion 14 that branches into a plurality of directions, and is discharged as it is (or after being conveyed to a duplex conveyance passage 18 to have images formed on both sides) to a discharge tray 17 by a pair of discharge rollers 15.

At a position opposite the driving roller 11 across the intermediate transfer belt 8, an image density sensor 40 is disposed. Used as the image density sensor 40 is typically an optical sensor composed of a light emitter such as an LED and a light receiver such as an photodiode. When the amount of toner attached to the intermediate transfer belt 8 is measured, shining measurement light from the light emitter onto reference images formed on the intermediate transfer belt 8 results in the measurement light striking the light receiver, partly as light reflected from the toner and partly as light reflected from the belt surface.

The light reflected from the toner and the belt surface contains regularly reflected light and irregularly reflected light. These regularly and irregularly reflected light are split by a polarizing splitter prism and then strike separate light receivers. The light receivers photoelectrically convert the received regularly and irregularly reflected light to feed output signals to the main control portion 80 (see FIG. 2). Based on the change of characteristics between the output signals ascribable to the regularly and irregularly reflected light, the density of the toner image is sensed.

Thus, the image density sensor (density sensing device) 40 senses the density of the toner image formed by the developing devices 3*a* to 3*d* and transferred to the intermediate transfer belt (transfer destination member) 8.

Figure 2:
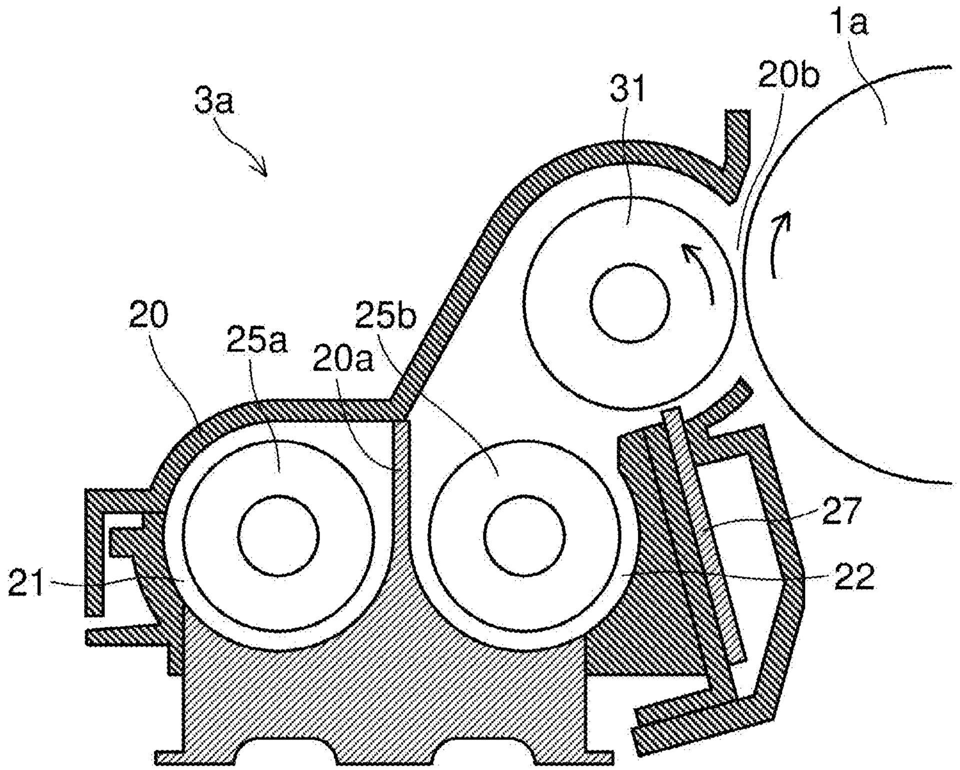
FIG. 2 is a side sectional view of a developing device 3*a* in the image forming apparatus 100 according to the first embodiment of the present disclosure.

FIG. 2 is a side sectional view of the developing device 3*a* incorporated in the image forming apparatus 100. While the following description deals with, as an example, the developing device 3*a* disposed in the image forming portion Pa in FIG. 1, the other developing devices 3*b* to 3*d* disposed in the image forming portions Pb to Pd are basically similarly configured and accordingly no overlapping description will be repeated.

As shown in FIG. 2, the developing device 3*a* includes a developer container 20 that stores two-component developer (hereinafter simply "developer") containing magnetic carrier and toner. The developer container 20 is divided into a stirring-conveying chamber 21 and a supplying-conveying chamber 22 by a partition wall 20*a*. In the stirring-conveying chamber 21 and the supplying-conveying chamber 22 respectively, a stirring-conveying screw 25*a* and a supplying-conveying screw 25*b* are rotatably disposed for mixing and stirring the toner supplied from a toner container 4*a* (see FIG. 1) with magnetic carrier and electrostatically charging the mixture.

The developer is stirred and conveyed by the stirring-conveying screw 25*a* and the supplying-conveying screw 25*b* along the axial direction (direction perpendicular to the plane of FIG. 2) to circulate between the stirring-conveying chamber 21 and the supplying-conveying chamber 22 through unshown developer passages formed in opposite end parts of the partition wall 20*a*. That is, the stirring-conveying chamber 21, the supplying-conveying chamber 22, and the developer passages constitute a developer circulation passage within the developer container 20.

The developer container 20 extends to the upper right in FIG. 2 and, to the upper right of the supplying-conveying screw 25*b* in the developer container 20, a developing roller (developer carrying member) 31 is disposed. Part of the outer circumferential surface of the developing roller 31 is exposed through an opening 20*b* in the developer container 20 to face the photosensitive drum 1*a*. The developing roller 31 rotates counterclockwise in FIG. 2.

The developing roller 31 is composed of a developing sleeve in a cylindrical shape that rotates counterclockwise in FIG. 2 and a magnet (not shown) that is fixed inside the developing sleeve and that has a plurality of magnetic poles. While here a developing sleeve with a knurled surface is used, it is also possible to use instead a developing sleeve with a number of dimples (depressions) formed in the surface, one with a blasted surface, one with a knurled, dimpled, and in addition blasted surface, or one with a plated surface.

The developer container 20 is also fitted with a restriction blade 27 along the longitudinal direction of the developing roller 31 (the direction perpendicular to the plane of FIG. 2). Between a tip part of the restriction blade 27 and the surface of the developing roller 31, a small gap is left.

FIG. 3 is an enlarged part view around the image forming portion Pa, showing control paths in the developing device 3*a* as well. While the following description deals with the configuration of the image forming portion Pa and the control paths in the developing device 3*a*, the other image forming portions Pb to Pd and the other developing devices 3*b* to 3*d* have basically a similar configuration and similar control paths and accordingly no overlapping description will be repeated.

The developing voltage power supply 43 is connected to the developing roller 31. The developing voltage power supply 43 includes an alternating-current constant voltage power supply 43*a* and a direct-current constant voltage power supply 43*b*. The alternating-current constant voltage power supply 43*a* outputs an alternating-current voltage with a sine waveform generated from a direct-current voltage pulse-modulated using a step-up transformer (not shown). The direct-current constant voltage power supply 43*b* outputs a direct-current voltage obtained by rectifying an alternating-current voltage with a sine waveform generated from a direct-current voltage pulse-modulated using a step-up transformer.

During image formation, the developing voltage power supply 43 applies to the developing roller (developer carrying member) 31 a developing voltage having an alternating-current voltage Vac overlaid on a direct-current voltage Vdc from the alternating-current constant voltage power supply 43*a* and the direct-current constant voltage power supply 43*b*. Applying the developing voltage to the developing roller 31 causes, with the potential difference between the developing roller 31 and the surface potential V0 on the photosensitive drum 1*a*, toner to fly from the developing roller 31 to the photosensitive drum 1*a*, and this develops the electrostatic latent image (exposed part) on the photosensitive drum 1*a*. Here, applying the developing voltage having the alternating-current voltage Vac overlaid on the direct-current voltage Vdc makes it easy to control the development properties of toner during image formation, resulting in improved image quality. While in this embodiment the developing voltage has an alternating-current voltage Vac overlaid on the direct-current voltage Vdc, it can be a simple direct-current voltage Vdc.

The developing current sensing portion 44 senses a developing current (developing direct current) that passes between the developing roller (developer carrying member) 31 and a photosensitive drum (image carrying member) 1*a*. Specifically the developing current sensing portion 44 senses a direct-current component (developing direct current) that passes between the developing roller 31 and the photosensitive drum 1*a* when the developing voltage is applied to the developing roller (developer carrying member) 31. The developing current sensing portion 44 also senses a direct-current component of a fogging toner current when the developing voltage applied to the developing roller 31 with a zero surface potential on the photosensitive drum (image carrying member) 1*a* is made zero.

In this embodiment, the developer is a two-component developer containing magnetic carrier and toner, and the direct-current component of the charging voltage applied in a non-charged state with a zero surface potential on the photosensitive drum (image carrying member) 1*a* is zero.

The charging voltage power supply 45 applies to the charging roller (charging member) 34 in the charging device 2*a* a charging voltage that contains at least a direct-current component. In this embodiment, during image formation, the charging voltage power supply 45 applies to the charging roller 34 a charging voltage having an alternating-current voltage overlaid on a direct-current voltage from the alternating-current constant voltage power supply 45*a* and the direct-current constant voltage power supply 45*b*. Changing the charging voltage allows adjustment to a predetermined value of the developing potential difference V0−Vdc between the surface potential V0 on the photosensitive drum 1*a* and the developing direct-current voltage (the direct-current component of the developing voltage applied to the developing roller 31). The charging voltage so applied can be a simple direct-current voltage.

The charging current sensing portion 46 senses a charging current (charging direct current) that passes between the charging roller (charging member) 34 and the photosensitive drum (image carrying member) 1*a*. Specifically, the charging current sensing portion 46 senses the direct-current component (charging direct current) of the charging current that passes between the charging roller (charging member) 34 and the photosensitive drum (image carrying member) 1*a* when the charging voltage is applied to the charging roller (charging member) 34.

The photosensitive layer 111 on the photosensitive drum 1*a* is formed by vapor deposition of amorphous silicon, which is a positively-chargeable photoconductor, and thus the photosensitive layer 111 has a high dielectric constant. Accordingly, unevenness of the surface potential difference on the photosensitive drum 1*a* may cause uneven image density in the developed toner image. To cope with that, applying a charging voltage having an alternating-current voltage overlaid in it helps suppress unevenness in the surface potential. In addition, with the direct-current voltage contained in the transfer voltage, the level of the surface potential can be controlled.

The transfer voltage power supply 47 applies to the primary transfer rollers (transferring members) 6*a* to 6*d* and to the secondary transfer roller 9 (see FIG. 1) a primary transfer voltage (transfer voltage) and a secondary transfer voltage respectively.

The cleaning device 7*a* includes a cleaning blade 32 that removes the residual toner on the surface of the photosensitive drum 1*a*, a rubbing roller 33 that removes the residual toner on the surface of the photosensitive drum 1*a* and that rubs and polishes the surface of the photosensitive drum 1*a*, and a conveying spiral 35 that discharges the residual toner removed from the photosensitive drum 1*a* by the cleaning blade 32 and the rubbing roller 33 out of the cleaning device 7*a*.

The image forming apparatus 100 includes the main control portion 80, which is configured with a CPU and the like. The main control portion 80 is connected to a storage portion 70 comprising a ROM, a RAM, and the like. Based on control programs and control data stored in the storage portion 70, the main control portion 80 controls different blocks in the image forming apparatus 100 (the charging devices 2*a* to 2*d*, the developing devices 3*a* to 3*d*, the exposure device 5, the primary transfer rollers 6*a* to 6*d*, the cleaning devices 7*a* to 7*d*, the secondary transfer roller 9, the fixing portion 13, the developing voltage power supply 43, the charging voltage power supply 45, the transfer voltage power supply 47, the developing current sensing portion 44, the charging current sensing portion 46, a voltage control portion 50, and the like). That is, the main control portion (control portion) 80 controls the image forming portions Pa to Pd, the developing voltage power supply 43, and the charging voltage power supply 45.

The voltage control portion 50 controls the developing voltage power supply 43, which applies a developing voltage to the developing roller 31, the charging voltage power supply 45, which applies the charging voltage to the charging roller 34, and the transfer voltage power supply 47, which applies the transfer voltages to the primary transfer rollers 6*a* to 6*d* and to the secondary transfer roller 9. The voltage control portion 50 can be configured as a control program stored in the storage portion 70.

To the main control portion 80, a liquid crystal display portion 90 and a transmitter-receiver portion 91 are connected. The liquid crystal display portion 90 functions as a touch panel on which a user makes various settings for the image forming apparatus 100, and also displays the status of the image forming apparatus 100, the progress of image formation, the number of sheets printed, and the like. The transmitter-receiver portion 91 communicates with the outside across a telephone or Internet network.

The image density sensor 48 senses the temperature around each of the photosensitive drums (image carrying member) 1*a* to 1*d*

As mentioned above, the surface potential on the photosensitive drum 1*a* may vary from the target value due to, for example, an error in the high-voltage circuit board in the charging voltage power supply 45. Conventionally, variation of the surface potential has to be adjusted by use of a dedicated jig on the production line of the image forming apparatus 100.

In this embodiment, the main control portion (control portion) 80 can perform, in addition to a standard image formation mode, a correction mode. Providing the correction mode aside from the image formation mode helps reduce the wait time for the user and improve convenience.

Figure 4:
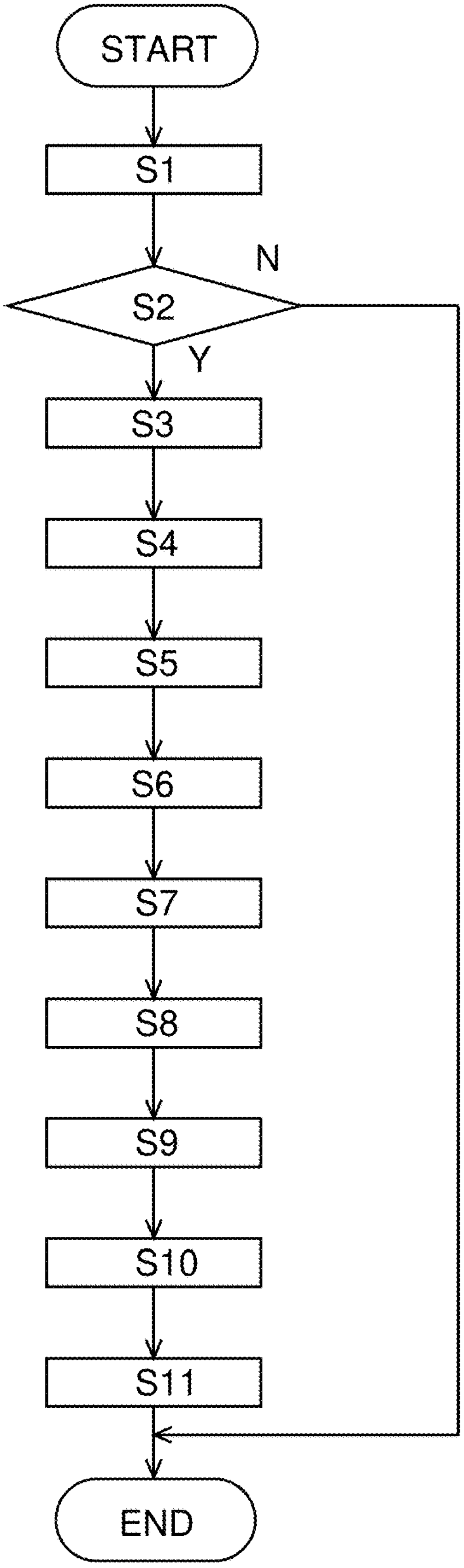
FIG. 4 is a flow chart showing an example of operation in an image formation mode on the image forming apparatus 100 according to the first embodiment of the present disclosure.
Figure 5:
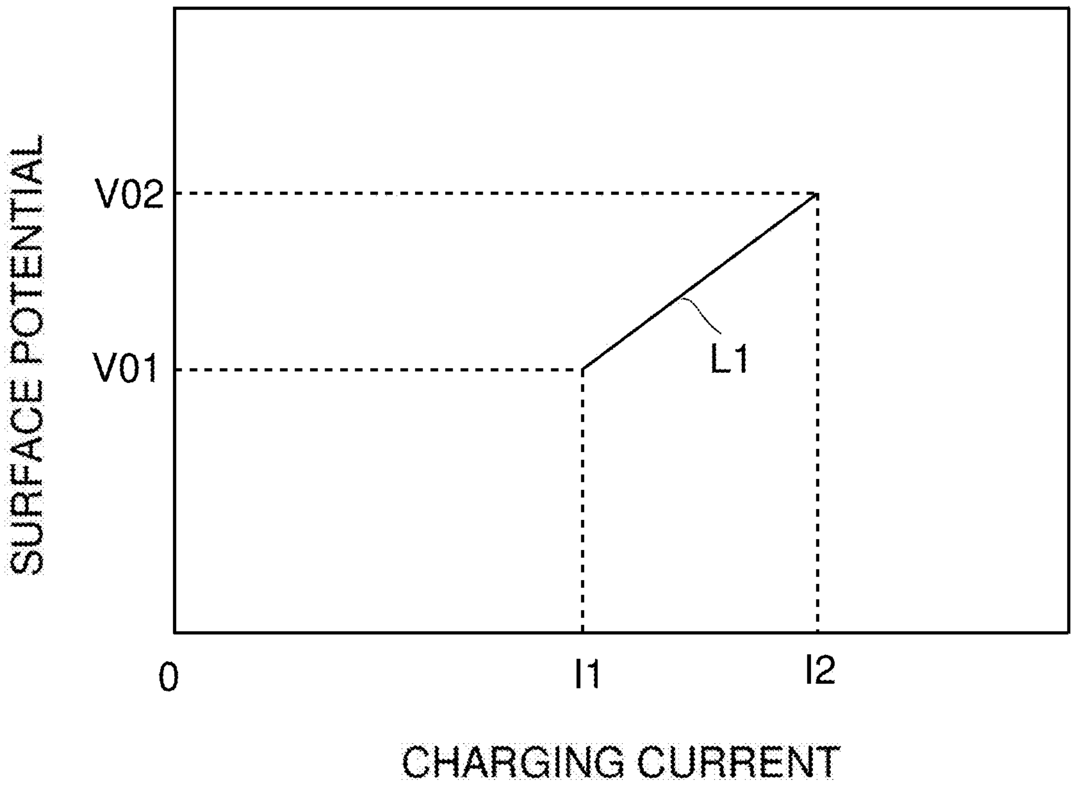
FIG. 5 is a graph showing a relationship between a charging current and the surface potential on a photosensitive drum 1*a*.

FIG. 4 is a flow chart showing an example of operation on the image forming apparatus 100 according to this embodiment. When a user enters an instruction to perform image formation, the main control portion 80 performs the image formation mode (Step S1). FIG. 5 is a graph showing a relationship between the charging current and the surface potential on the photosensitive drum 1*a*, and this relationship is previously stored in the storage portion 70. A first relational expression L1 shown in FIG. 5 represents the relationship between the charging current and the surface potential on the photosensitive drum 1*a*. In this embodiment, the first relational expression L1 is given as a linear function.

In the image formation mode, image formation proceeds while adjusting the surface potential by controlling the charging voltage applied based on the relationship (first relational expression L1) between the charging current and the surface potential on the image carrying member. For example, when the surface potential V01 is set to a target value, the charging current I1 is output based on the first relational expression L1.

When a job in the image formation mode ends, a check is made of whether it is time to perform the correction mode stored in the storage portion 70 (Step S2). The check of whether it is time to perform the correction mode is made, for example, based on whether the cumulative number of sheets printed after the previous execution of the correction mode has reached a predetermined number (e.g., 50 K). Performing the correction mode after the end of the image formation mode helps reduce the wait time for the user. The correction mode can be performed for the first time when power is turned on for the first time after shipment.

When the correction mode is started, based on the first relational expression L1 (see FIG. 5) used in the image formation mode, the main control portion 80 calculates a plurality of different surface potentials V01 and V02 along with the corresponding charging currents I1 and I2 (Step S3). The first relational expression L1 is either a relational expression set and stored in the storage portion 70 before shipment or a relational expression corrected and stored in the storage portion 70 during the previous execution of the correction mode.

Next, the direct-current component of the developing voltage applied to the developing roller 31 with a zero surface potential on the photosensitive drum (image carrying member) 1*a* is made zero, and a reference developing direct current (reference direct current) Idcm sensed by the developing current sensing portion 44 is measured (Step S4). Here, the reference developing direct current Idcm is a fogging toner current that occurs as toner moves.

Next, the charging voltage is applied to the charging roller (charging member) 34 such that the charging current sensed by the charging current sensing portion 46 is equal to the charging current I1 calculated at Step S3, and then different developing voltages are applied one after another. Meanwhile, the developing direct currents Idc1 and Idc2 that the developing current sensing portion 44 senses for different direct-current components (developing direct-current voltages) Vdc1 and Vdc2 of the different developing voltages applied are each measured (Step S5).

If the developing direct current Idc1 corresponding to the developing direct-current voltage Vdc1 applied first is lower than the reference direct current Idcm, preferably a developing direct-current voltage Vdc2 higher than the developing direct-current voltage Vdc1 is applied. On the other hand, if the developing direct current Idc1 corresponding to the developing direct-current voltage Vdc1 applied first is higher than the reference direct current Idcm, preferably a developing direct-current voltage Vdc2 lower than the developing direct-current voltage Vdc1 is applied.

Figure 6:
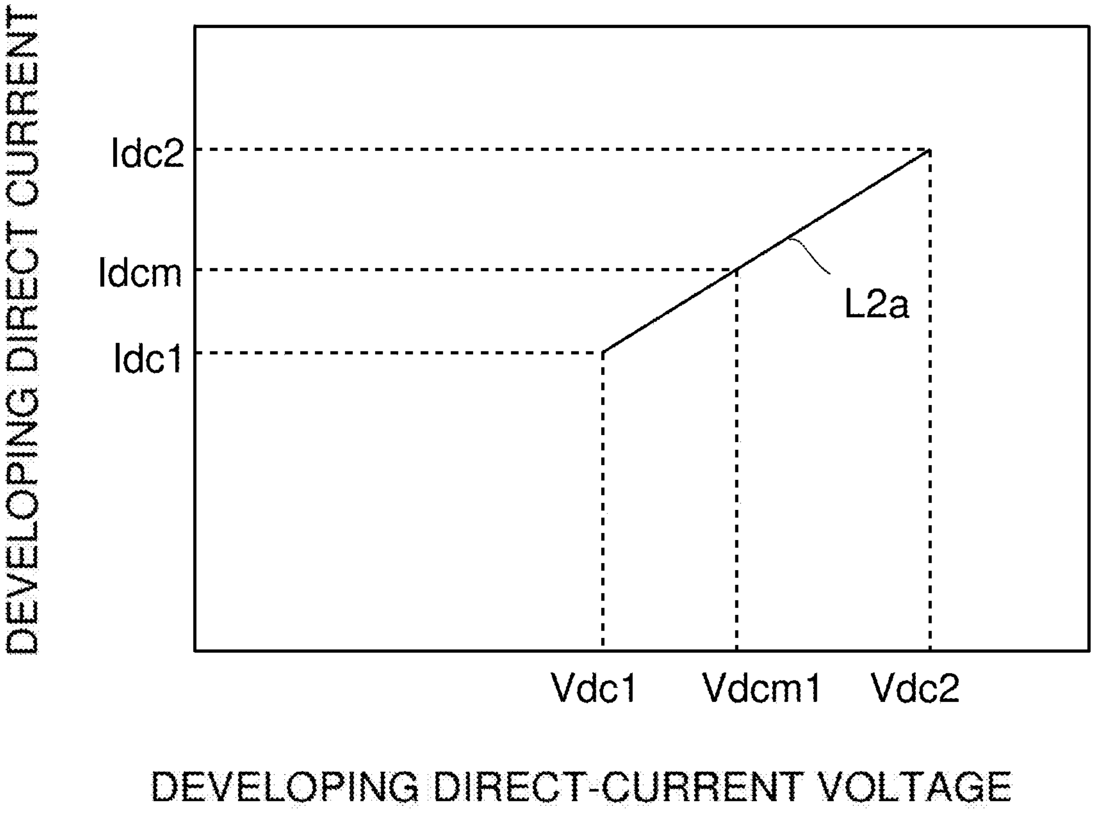
FIG. 6 is a graph showing a relationship between a developing direct-current voltage and a developing direct current.

Next, based on the applied developing direct-current voltages Vdc1 and Vdc2 and the sensed developing direct currents Idc1 and Idc2, a second relational expression L2*a* is created (Step S6). FIG. 6 is a graph showing the relationship between the developing direct-current voltage and the developing direct current and, in this embodiment, the second relational expression L2*a* is given as a linear function.

Next, a developing direct-current voltage Vdcm1 that produces a developing direct current (developing current) Idcm with a current value equal to the reference developing direct current Idcm measured at Step S4 is calculated from the relationship represented by the second relational expression L2*a*. Here, the developing direct-current voltage Vdcm1 is the surface potential Vdcm1 on the photosensitive drum 1*a* corresponding to the charging current I1 (Step S7).

Next, the charging voltage is applied to the charging roller (charging member) 34 such that the charging current sensed by the charging current sensing portion 46 is equal to the charging current I2 calculated at Step S3, and then different developing voltages are applied one after another. Meanwhile, the developing direct currents Idc3 and Idc4 that the developing current sensing portion 44 senses for the direct-current components (developing direct-current voltages) Vdc3 and Vdc4 of the different developing voltages applied are each measured (Step S8). Here, the application of the developing direct-current voltages Vdc3 and Vdc4 is performed through a procedure similar to that at Step S5.

Figure 7:
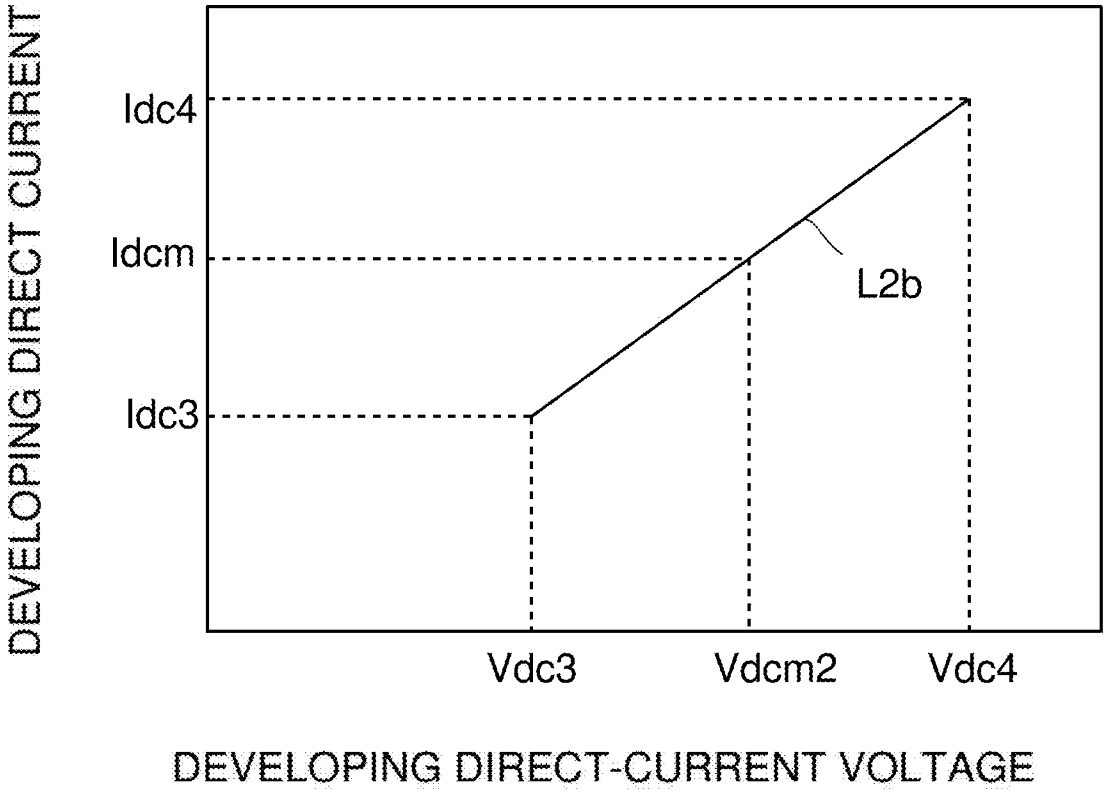
FIG. 7 is a graph showing a relationship between a developing direct-current voltage and a developing direct current.

Next, based on the developing direct-current voltages Vdc3 and Vdc4 applied and the developing direct currents Idc3 and Idc4 sensed, a second relational expression L2*b* is created (Step S9). FIG. 7 is a graph showing the relationship between the developing direct-current voltage and the developing direct current and, in this embodiment, the second relational expression L2*b* is given as a linear function.

Next, a developing direct current Vdcm2 that produces a developing direct current (developing current) Idcm with a current value equal to the reference developing direct current Idcm measured at Step S4 is calculated from the relationship represented by the second relational expression L2*b*. Here, the developing direct-current voltage Vdcm2 is the surface potential Vdcm2 on the photosensitive drum 1*a* corresponding to the charging current I2 (Step S10).

Figure 8:
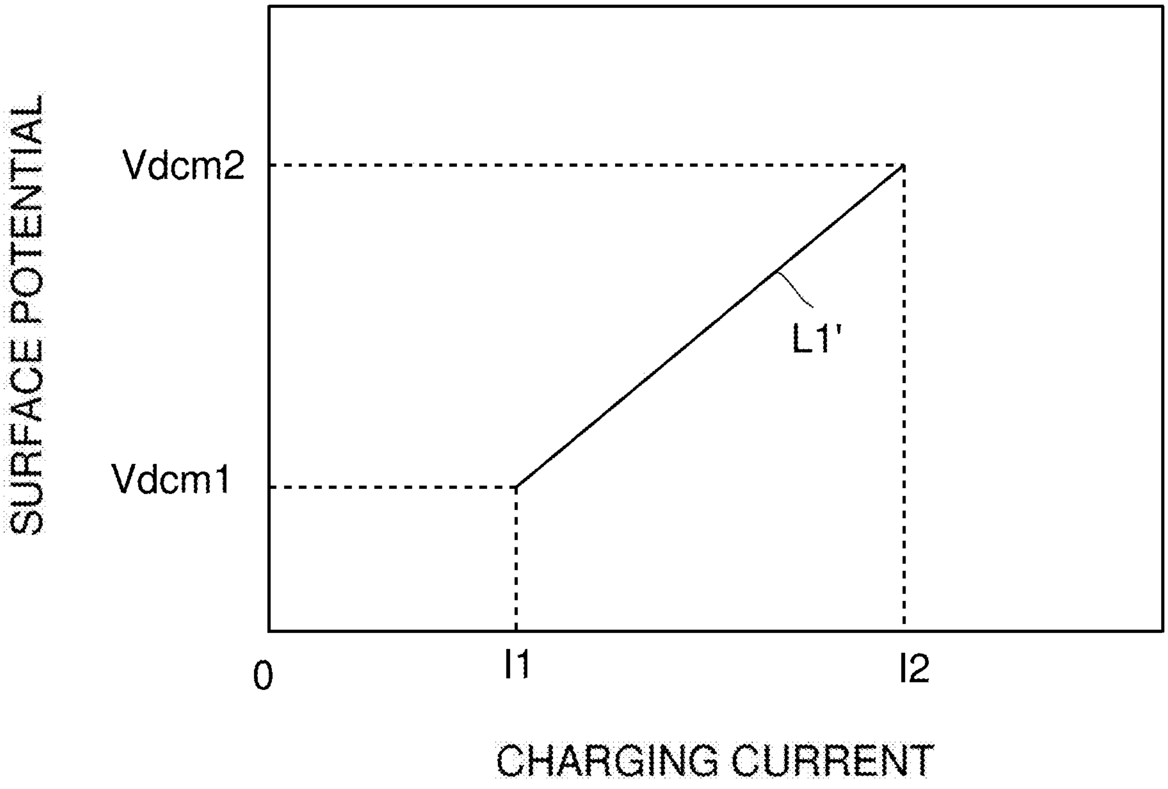
FIG. 8 is a graph showing a relationship between a corrected charging current and the surface potential on the photosensitive drum 1*a*.

Next, from the charging current I1 and the developing voltage Vdcm1 calculated at Step S7 and the charging current I2 and the developing direct current Vdcm2 calculated at Step S10, a corrected first relational expression L1' is created (Step S11). FIG. 8 is a graph showing the relationship between the corrected charging current and the surface potential on the photosensitive drum 1*a*. The corrected first relational expression L1' is stored in the storage portion 70 and the correction mode ends. Next time the image formation mode is performed, based on the first relational expression L1' the charging voltage applied is controlled and thereby the surface potential is adjusted in performing image formation.

In this embodiment, when the correction mode is performed, the main control portion (control portion) 80 calculates the surface potential on the photosensitive drum (image carrying member) 1*a* based on the developing voltage applied and the developing current sensed by the developing current sensing portion 44 (Steps S3 to S10). Then, based on the calculated surface potential, the main control portion 80 corrects the relationship (first relational expression L1) between the charging current and the surface potential to create a new relationship (first relational expression L1') between the charging current and the surface potential (Step S11).

By performing the image formation mode the next time based on the first relational expression L1' corrected through the execution of the correction mode, it is possible to prevent variation of the surface potential on the photosensitive drum 1*a* from the target value and to suppress carrier development and toner fogging and thereby prevent image defects. Moreover, by observing the variation of the charging current on a long-term basis, it is possible to accurately sense a drop in the performance of the drum unit including the photosensitive drum 1*a*. This makes it possible to predict the replacement time of the drum unit.

Moreover, when the correction mode is performed, the main control portion (control portion) 80 applies, for the same charging current I1 or I2, different developing voltages (developing direct-current voltages) Vdc1, Vdc2, Vdc3, and Vdc4 and calculates the surface potentials Vdcm1 and Vdcm2 from the relationship (second relational expression L2*a* and L2*b*) between the developing currents (developing direct currents) Idc1, Idc2, Idc3, and Idc4 sensed by the developing current sensing portion 44 and the developing voltages (developing direct-current voltages) Vdc1, Vdc2, Vdc3, and Vdc4. It is thus possible to accurately calculate the surface potential based on the developing voltage and the developing current.

Moreover, when the correction mode is performed, the main control portion (control portion) 80 calculates the developing voltages Vdcm1 and Vdcm2 that produce a developing current with a current value equal to the reference developing direct current Idcm that the developing current sensing portion 44 senses in a non-charged state with a zero surface potential on the photosensitive drum (image carrying member) 1*a* from the relationship (second relational expressions L2*a* and L2*b*) between the developing current and the developing voltage, and calculates the calculated developing voltages Vdcm1 and Vdcm2 as the surface potentials Vdcm1 and Vdcm2 (Steps S7 and S11). It is thus possible to more accurately calculate the surface potential.

In this embodiment, during the execution of the image formation mode, based on the relationship between the charging current and the surface potential on the image carrying member, the charging voltage applied is controlled and thereby the surface potential is adjusted in performing the image formation. Here, the relationship between the charging current and the surface potential on the image carrying member changes as the temperature around the photosensitive drum 1*a* changes. For example, as the temperature around the photosensitive drum 1*a* rises, the charging current can be increased to suppress variation of the surface potential.

Accordingly, when the correction mode is performed, preferably, the relationship between the charging current and the surface potential on the image carrying member is corrected based on variation of the temperature around the photosensitive drum 1*a*. That is, when the correction mode is performed, preferably, the main control portion (control portion) 80 corrects the relationship between the charging current and the surface potential based on predicted variation of the temperature around the photosensitive drum 1*a* and the calculated surface potential. It is thus possible to suppress deviation of the surface potential in response to variation in the temperature around the photosensitive drum 1*a* during the execution of the image formation mode.

Figure 9:
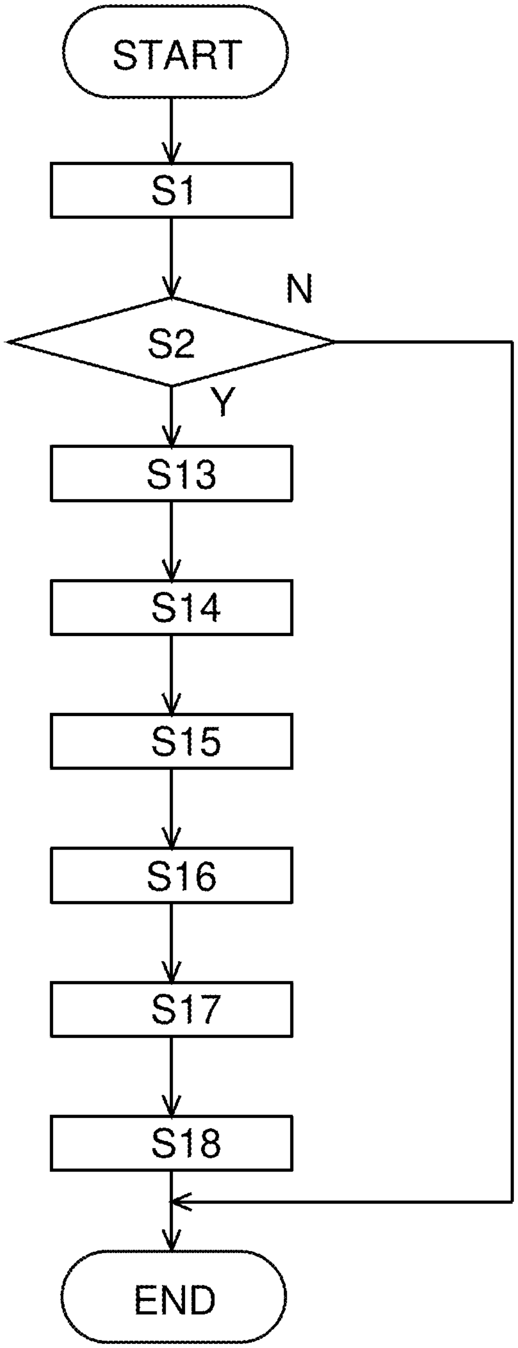
FIG. 9 is a flow chart showing an example of operation in an image formation mode on an image forming apparatus 100 according to a second embodiment of the present disclosure.

Second Embodiment: Next, a second embodiment of the present disclosure will be described. FIG. 9 is a flow chart showing an example of operation on an image forming apparatus 100 according to the second embodiment. For convenience' sake, such parts as find their counterparts in the first embodiment described previously and shown in FIGS. 1 to 8 are identified by the same reference signs. In the second embodiment, the procedure of the correction mode differs from that in the first embodiment.

FIG. 9 is a flow chart showing an example of operation on the image forming apparatus 100 according to this embodiment. Steps S1 an S2 here are the same as those in the first embodiment.

When the correction mode is performed, based on the first relational expression L1 (see FIG. 5) used during the execution of the image formation mode, the main control portion 80 calculates the charging current corresponding to, for example, a target surface potential V01 (Step S13).

Next, the direct-current component of the developing voltage applied to the developing roller 31 with a zero surface potential on the photosensitive drum (image carrying member) 1*a* is made zero, and a reference developing direct current Idcm that the developing current sensing portion 44 senses is measured (Step S14). Here, the reference developing direct current Idcm is a fogging toner current that occurs as toner moves.

Next, the charging voltage is applied to the charging roller (charging member) 34 such that the charging current sensed by the charging current sensing portion 46 is equal to the charging current I1 calculated at Step S13, and then the developing voltage E is applied. In this state, the developing direct current Idc5 sensed by the developing current sensing portion 44 is measured (Step S15).

Next, the charging voltage is applied to the charging roller (charging member) 34 such that a charging current I2 different from the charging current I1 is sensed, and then the developing voltage E is applied. In this state, the developing direct current Idc6 sensed by the developing current sensing portion 44 is measured (Step S16).

If the developing direct current Idc5 is lower than the reference developing direct current Idcm, preferably, a charging current I2 higher than the charging current I1 is passed. By contrast, if the developing direct current Idc5 is higher than the reference developing direct current Idcm, preferably, a charging current I2 lower than the charging current I1 is passed.

Figure 10:
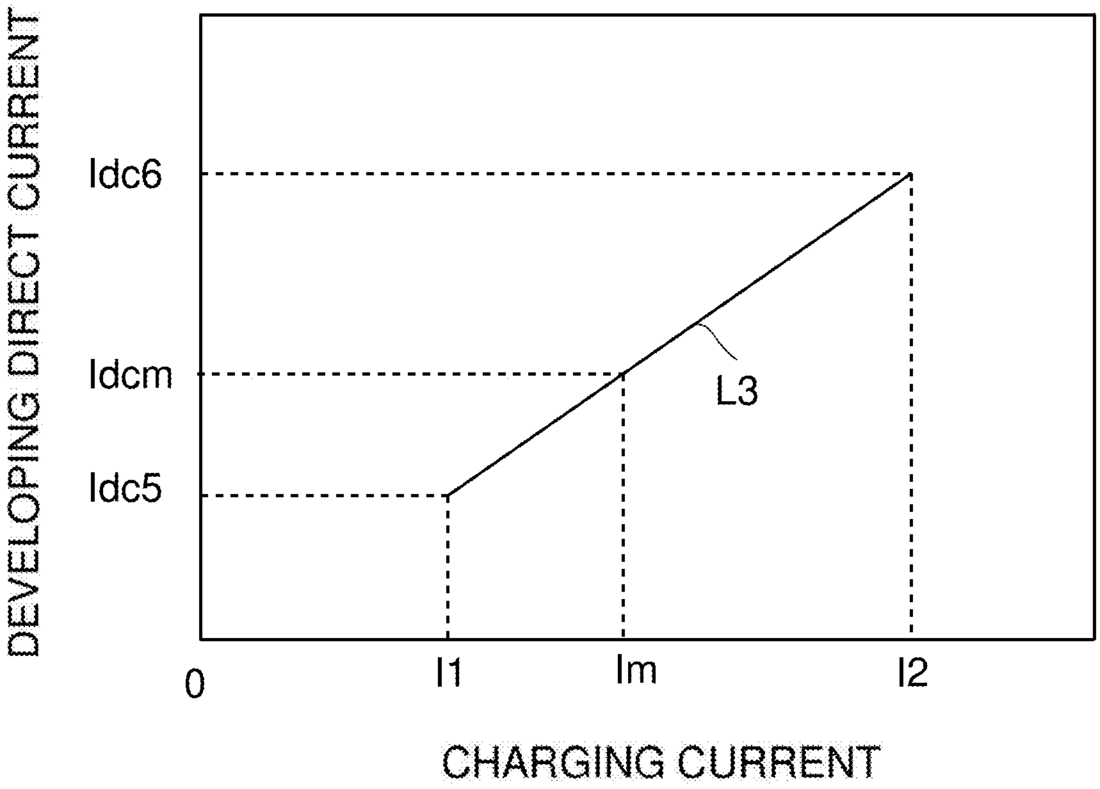
FIG. 10 is a graph showing a relationship between a charging current and a developing direct current.

Next, from the charging currents I1 and I2 and the developing direct currents Idc5 and Idc6, a third relational expression L3 is created (Step S17). FIG. 10 is a graph showing the relationship between the charging current and the developing direct current and, in this embodiment, the third relational expression L3 is given as a linear function.

Next, the charging current Im that passes when a developing current with a current value equal to the reference developing direct current Idcm passes is calculated from the third relational expression L3, and the developing voltage E corresponding to the calculated charging current Im is calculated as the surface potential (Step S18). The corrected relationship between the charging current Im and the developing voltage E is stored in the storage portion 70 and the correction mode ends. In this way, next time the image formation mode is performed, image formation is performed through control in which the charging voltage is applied based on the relationship between the charging current Im and the developing voltage E.

In this embodiment, when the correction mode is performed, the main control portion (control portion) 80 applies the same developing voltage E for different charging currents I1 and I2, and calculates the surface potential from the relationship (relational expression L3) between the developing current sensed by the developing current sensing portion 44 and the charging current (Step S15). It is thus possible to accurately calculate the surface potential based on the developing voltage and the developing current.

More specifically, when the correction mode is performed, the main control portion (control portion) 80 calculates the charging current Im that yields a current value equal to the reference developing direct current Idcm that the developing current sensing portion 44 senses when the direct-current component of the developing voltage applied to the developing roller 31 with a zero surface potential on the photosensitive drum 1*a* is made zero from the relationship (relational expression L3) between the developing current and the charging current, and calculates the developing voltage E corresponding to the calculated charging current Im as the surface potential (Step S18). It is thus possible to more accurately calculate the surface potential.

An evaluation was conducted to check whether performing the correction mode helped suppress image defects. Tests were performed on an image forming apparatus 100 (manufactured by Kyocera Document Solutions Inc.) like the one shown in FIG. 1, using the photosensitive drums 1*a* to 1*d* (with an outer diameter of 30 mm) with an amorphous silicon (a-Si) photosensitive layer 111. The charging roller 34 was composed of epichlorohydrin rubber (with an outer diameter of 12 mm, manufactured by Synztec Co., Ltd.) laid on a shaft (with a outer diameter of 8 mm). The charging roller 34 had an inner resistance value of $10^5$ or more but $10^6$ or less (Ω) across the transfer sheet width and a hardness of 60. The pressing force of the charging roller 34 against the photosensitive drums 1*a* to 1*d* was 10 (N), and the charging voltage had an alternating-current voltage laid on a direct-current voltage. The printing speed was 70 sheets per minute.

The developing devices 3*a* to 3*d* had a developing roller 31 with an outer diameter of 20 mm that had recesses in the form of V-grooves with a depth of 80 μm formed in 80 rows along the circumferential direction by knurling. Used as the restriction blade 27 was a magnetic blade (with a thickness of 1.5 mm) made of stainless steel (SUS430).

The developing roller 31 had an outer diameter of 20 mm, and the amount of developer conveyed by the developing roller 31 was 350 g/m$^2$. The circumferential velocity ratio of the developing roller 31 to the photosensitive drums 1*a* to 1*d* was 1.8 (one trailing the other at where they face each other), and the distance between the developing roller 31 and the photosensitive drums 1*a* to 1*d* was 0.37 mm. The developing roller 31 was fed with, as the developing voltage, a voltage having overlaid on it an alternating-current voltage Vpp with a rectangular wave form at 10 kHz, a duty of 50%, and a voltage of 1100 V.

A two-component developer containing a positively-chargeable toner with an average particle diameter of 6.8 μm and a ferrite resin coated carrier with an average particle diameter of 40 μm was used, with a toner concentration of 6%.

The evaluation proceeded by checking whether image defects occurred as the number of sheets printed increased.

In Practical Example and Comparative Example, the target value of the developing potential difference V0–Vdc during the execution of the image formation mode was set to 50 V. The print ratio was 5%, and continuous printing in black was performed. The evaluation was done while the temperature around the image forming apparatus 100 was varied.

In Practical Example, the charging roller 34 was controlled with the charging direct current and the correction mode was not performed. In Practical Example, the correction mode was performed every 50 K sheets. In the correction mode, based on the variation of the temperature around the photosensitive drum 1*a*, the relationship between the charging current and the surface potential was corrected.

In Practical Example and Comparative Example, the surface potential was calculated by the method described above using the developing voltage.

For fogging, the image density on an unprinted sheet and the image density in a blank part after printing were measured with a reflection density meter (model TC-6DS manufactured by Tokyo Denshoku Co., Ltd.) From the measured results, the fog density was calculated according to the formula (fog density)=(blank-part image density after printing)–(unprinted sheet-image density). The measurement results are shown in a table in FIG. 11. A fog density of 0.01 or less was evaluated as "GOOD" while a fog density higher than 0.01 was evaluated as "POOR."

Through the evaluation described above, it was found that, by performing the correction mode so as to correct the relationship between the charging current and the surface potential based on temperature variation around the photosensitive drum 1*a*, it is possible to prevent image defects during image formation.

The embodiments described above are not meant to limit the scope of the present disclosure, which can thus be implemented with any modifications made without departure from the spirit of the present disclosure. For example, the toner charge amount can be calculated by any method other than the one described above. For example, while in the above embodiments the configuration of the image forming portions Pb to Pd and the control paths for the developing devices 3*b* to 3*d* are omitted from description, the alternating-current voltage power supplies 43*a* and 45*a* in the developing voltage power supply 43 and the charging voltage power supply 45 can be shared among the photosensitive drums 1*a* to 1*d* (see FIG. 3). This helps reduce the cost of the image forming apparatus 100.

While the above embodiments deal with, as an example of the image forming apparatus 100, a color printer like the one shown in FIG. 1, the present disclosure is applicable not only to color printers but also to monochrome and color copiers, digital multifunction peripherals, facsimile machines, and the like.

The present disclosure finds applications in image forming apparatuses provided with a charging roller.

What is claimed is:

1. An image forming apparatus comprising:
an image forming portion including:
an image carrying member having a photosensitive layer formed on a surface thereof;
a charging device including a charging member that electrostatically charges the image carrying member;
an exposure device that forms an electrostatic latent image by exposing to light the image carrying member electrostatically charged by the charging device; and
a developing device disposed opposite the image carrying member and including a developer carrying member that carries developer, the developing device forming a toner image by attaching toner to the electrostatic latent image formed on the image carrying member;

a developing voltage power supply that applies a developing voltage to the developer carrying member;

a charging voltage power supply that applies a charging voltage containing at least a direct-current component to the charging member;

a developing current sensing portion that senses a developing current passing between the developer carrying member and the image carrying member;

a charging current sensing portion that senses a charging current passing between the charging member and the image carrying member; and a control portion that controls the image forming portion, the developing voltage power supply, and the charging voltage power supply, wherein the control portion can perform an image formation mode in which the control portion determines, based on a first relational expression representing a relationship between the charging current and a surface potential on the image carrying member, the charging current corresponding to the surface potential set as a target value and performs image formation by controlling the charging voltage so as to output the determined charging current, and a correction mode in which the control portion corrects the first relational expression, and when the correction mode is performed, the control portion calculates the surface potential on the image carrying member based on the developing voltage applied and the developing current sensed by the developing current sensing portion and corrects the first relational expression based on the calculated surface potential.

2. The image forming apparatus according to claim 1, wherein when the correction mode is performed, the control portion applies different developing voltages as the developing voltage for the same charging current and calculates the surface potential based on a second relational expression representing a relationship between the developing current sensed by the developing current sensing portion and the developing voltage.

3. The image forming apparatus according to claim 2, wherein when the correction mode is performed, the control portion calculates, based on the second relational expression, the developing voltage that produces the developing current with a same current value as a reference developing current sensed by the developing current sensing portion in a non-charged state with a zero surface potential on the image carrying member, and calculates the calculated developing voltage as the surface potential.

4. The image forming apparatus according to claim 1, wherein when the correction mode is performed, the control portion applies the same developing voltage for different charging currents as the charging current, and calculates the surface potential from a relationship between the developing current sensed by the developing current sensing portion and the charging current.

5. The image forming apparatus according to claim 4, wherein when the correction mode is performed, the control portion calculates, from a relationship between the developing current and the charging current, the charging current that produces the developing current with a same current value as a reference developing current sensed by the developing current sensing portion in a non-charged state with a zero surface potential on the image carrying member, and calculates the developing voltage corresponding to the calculated charging current as the surface potential.

6. The image forming apparatus according to claim 3, wherein the developer is a two-component developer containing magnetic carrier and toner, and when the correction mode is performed, the direct-current component of the charging voltage that the control portion applies in a non-charged state with a zero surface potential on the image carrying member is zero.

7. The image forming apparatus according to claim 1, further comprising:

a temperature measurement portion that measures temperature around the image carrying member, and when the correction mode is performed, the control portion corrects the first relational expression based on predicted variation of the temperature around the image carrying member and the calculated surface potential.

* * * * *